United States Patent [19]

Shalev

[11] Patent Number: 4,897,737

[45] Date of Patent: Jan. 30, 1990

[54] APPARATUS FOR SCAN ROTATION IN IMAGE SCANNING EQUIPMENT

[75] Inventor: Eli Shalev, Kfar Saba, Israel

[73] Assignee: Scitex Corporation Ltd., Herlia, Israel

[21] Appl. No.: 245,667

[22] Filed: Sep. 19, 1988

[30] Foreign Application Priority Data

Sep. 23, 1987 [IL] Israel ................................ 84000

[51] Int. Cl.$^4$ ............................................. H04N 1/06
[52] U.S. Cl. ................................ 358/489; 358/474; 358/490
[58] Field of Search ............... 358/256, 400, 285, 474, 358/292, 493, 289, 489, 490, 491, 495; 382/9

[56] References Cited

U.S. PATENT DOCUMENTS

| 4,268,870 | 5/1981 | Kitamura et al. | 358/285 |
| 4,745,487 | 5/1988 | Nishikawa | 358/285 |
| 4,760,407 | 7/1988 | Arimoto et al. | 358/296 |
| 4,816,920 | 3/1989 | Paulsen | 358/474 |

OTHER PUBLICATIONS

Multiple-Line Interlaced Facsimile Scanning, Richard C. Marshall, Xerox Disclosure Journal, vol. 2, No. 1, p. 17.

Primary Examiner—James J. Groody
Assistant Examiner—Kim Yen Vu
Attorney, Agent, or Firm—Pearne, Gordon, McCoy & Granger

[57] ABSTRACT

Apparatus for providing controllable scan rotation of the image representation of an original revolving in a drum scanner is disclosed, the apparatus having: illumination means defining an illuminated line segment parallel to the drum revolution axis on at least a portion of the revolving original; and a scanning head moving in parallel to the drum revolution axis in accordance with a predetermined pitch, the scanning head having: imaging apparatus for providing the image of said illuminated line segment; and deflection apparatus providing a scanning beam with a controllable sweeping motion along said illuminated line segment image so as to scan successive points of light thereon during revolution of the drum, the controllable sweeping motion being synchronized with the speed of the drum revolution so as to provide on the portion of the revolving original a locus of scanned points having an oblique angle with respect to the drum axis for rotating the image representation.

15 Claims, 4 Drawing Sheets

APPARATUS FOR SCAN ROTATION IN IMAGE SCANNING EQUIPMENT

FIELD OF THE INVENTION

The present invention relates to apparatus used with electronic image reproduction equipment, more particularly, to apparatus for rotating the image scanning direction in a drum scanner.

BACKGROUND OF THE INVENTION

The construction and operation of rotating drum image scanning equipment is well known in the art of electronic image reproduction equipment. Basically, the image which is placed on the drum is scanned in a spiral with a small pitch which is set according to the required lines per inch resolution, so that during scanning the light beam moves slowly from the left side of the drum to the right side. Since the scanning line pattern is essentially perpendicular to the drum revolution axis, the angle of the image provided during scanning has a one-to-one relationship with the angle with which the material to be scanned is placed on the drum.

If, during the set-up procedure for this type of equipment, the material to be scanned is placed on the drum incorrectly, such as for example, where the edge of an original print is not properly aligned with the direction of drum revolution, the resulting image reproduction will be tilted. This misalignment is likely to be evident especially where several pictures are to be combined on one page, and normally is corrected by repositioning and re-scanning the image, after which the whole process may have to be repeated yet again if another error is found.

It would therefore be desirable to simplify the operation of drum scanning equipment and allow correction of misaligned pictures.

In addition, the required enlargement and rotation angle for a picture must be measured before the picture is put on the drum. This is a time consuming process which usually requires special equipment such as an enlarging machine.

It would therefore be desirable to measure the rotation angle in a fast interactive process while the picture is on the drum so that it can be corrected automatically during scanning.

SUMMARY OF THE INVENTION

Accordingly, it is a principal object of the invention to overcome the above-mentioned disadvantages and provide apparatus for scan rotation of the image in a drum scanner. The invention allows correction of a misaligned image without the need for physically repositioning the image on the drum.

In accordance with a preferred embodiment of the invention, there is provided apparatus for providing controllable scan rotation of the image representation of an original revolving in a drum scanner, the apparatus comprising:

illumination apparatus defining an illuminated line segment parallel to the drum revolution axis on at least a portion of the revolving original; and a scanning head moving in parallel to the drum revolution axis in accordance with a predetermined pitch, said scanning head comprising:

imaging apparatus for providing the image of the illuminated line segment; and deflection apparatus providing a scanning beam with a controllable sweeping motion along the illuminated line segment image so as to scan successive points of light thereon during revolution of the drum, the controllable sweeping motion being synchronized with the speed of the drum revolution so as to provide on the portion of the revolving original a locus of scanned points having an oblique angle with respect to the drum axis for rotating the image representation.

In the preferred embodiment, the illumination apparatus comprises a light source providing a short length of line illumination parallel to the drum revolution axis on a portion of the original mounted on the drum. The deflection apparatus comprises a vibrating mirror disposed in the scanning head between the scanner lens and the photomultiplier unit receiving the light. The vibrating mirror sweeps the scanning beam along the illuminated segment during a drum revolution and this creates a locus of scanned points in the shape of a circular helix about the drum and having an oblique angle on the original with respect to the drum revolution axis.

At the end of each drum revolution, the scanning beam is retraced in sawtooth fashion to a starting point from which the sweeping motion is periodically repeated on each of the continuing drum revolutions. The resulting oblique angle for repeated scanning is equivalent to conventional scanning of an original which has been physically rotated on the drum. By changing the amplitude of the sweeping motion, the oblique angle is changed so that the overall effect introduces a controllable angle of scan rotation into the scanned image. The angle of scan rotation is proportional to the amplitude of the sweeping motion on the illuminated line segment.

The result is that the angle of scan rotation of the image representation is achieved without physically re-positioning the original which is mounted on the drum, making it very easy for the drum scanner equipment operator to correct for image misalignment on the drum during the set-up procedure. It also makes possible a fast scan by the host computer for purposes of calculating the image orientation and correcting if necessary on a subsequent scan.

In the preferred embodiment, the vibrating mirror comprises a galvo mirror based on an optical deflector which uses a moving-iron galvanometer to drive a mirror in an optical deflection excursion range. The deflection speed is synchronized with the drum revolution speed to provide one deflection cycle along the illuminated line segment per revolution. The excursion range thus defines the scan rotation angle. A waveform generator controlled by a computer is used to drive the galvanometer for this purpose.

A feature of the invention is that the starting point for the sweeping motion of the scanning beam can be adjusted between sucessive repetitions thereof so as to provide a series of starting points forming a crop line which gives the scanned image a rectangular shape. The adjustment is made by horizontally and vertically incrementing the starting point location. The horizontal increment corresponds to the predetermined pitch, and the vertical increment is determined by a trigonometric relationship between the pitch and the scan rotation angle.

In the preferred embodiment, the light source providing the illuminated line segment is moved together with the scanning head parallel to the drum revolution axis in accordance with the predetermined pitch.

In an alternative embodiment, the light source provides the illuminated line segment in the form of long line illumination, having a length approximately the length of the drum In this case, the light source location is static and only the scanning head is moved.

In one embodiment, the light source providing the illuminated line segment is disposed within the drum so that light is transmitted through the original to the scanning head.

In still another alternative embodiment, the light source providing the illuminated line segment is disposed outside the drum so that reflected light from the original is provided to the scanning head.

Other features and advantages of the apparatus according to the present invention will become apparent from the drawings and the description contained hereinbelow.

BRIEF DESCRIPTION OF THE DRAWINGS

For a better understanding of the present invention with regard to the embodiments thereof, reference is made to the accompanying drawings in which like numerals designate corresponding elements or sections throughout, and in which:

FIG. 4 is a sectional view taken along line A—A of the scanner of FIG. 3, featuring a deflection apparatus in the scanning head for providing the scanning line pattern of FIGS. 2-2a.

DETAILED DESCRIPTION OF A PREFERRED EMBODIMENT

Figure 1:
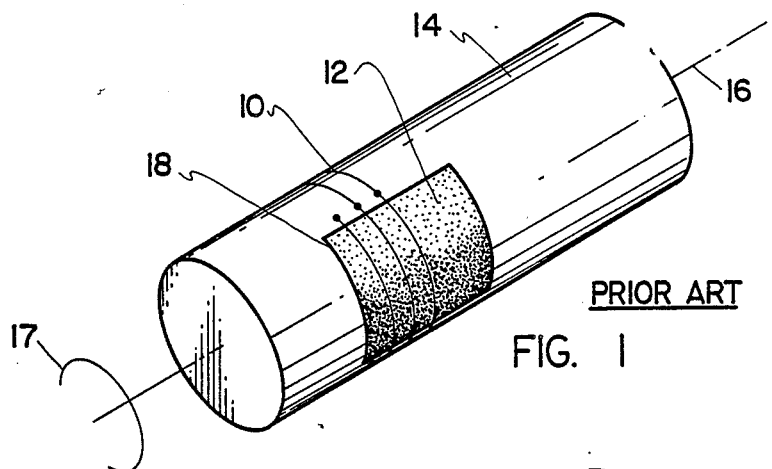
FIG. 1 is a schematic illustration of a prior art scanning line pattern for a drum scanner featuring a spiral having a predetermined pitch.

Referring now to FIG. 1, there is shown a schematic illustration of a prior art spiral scanning line pattern 10 for a drum scanner in which a scanning beam follows a predetermined pitch which is set according to the necessary line per inch resolution. The original 12 which is to be scanned is placed on the drum 14 and revolves about the drum revolution axis 16 in the direction of arrow 17 during the scanning process. When the original 12 is placed on the drum 14 during the set-up procedure, it is aligned with respect to an edge 18 or other mark relative to the drum revolution. This means that the original 12 will be properly aligned for the scanning line pattern 10 shown.

If, however, there is misalignment of the original 12 on the drum 14, an angular rotation is introduced in the resulting scanned image. This is because scanning line pattern 10 is essentially perpendicular to the drum revolution axis 16, so that there is a one-to-one relationship between the angle with which the original 12 is placed on the drum 14 and the angle of rotation of the scanned image. The misalignment can only be corrected by repeating the scanning procedure after first taking the picture off drum 14 and adjusting its orientation.

Figure 2:
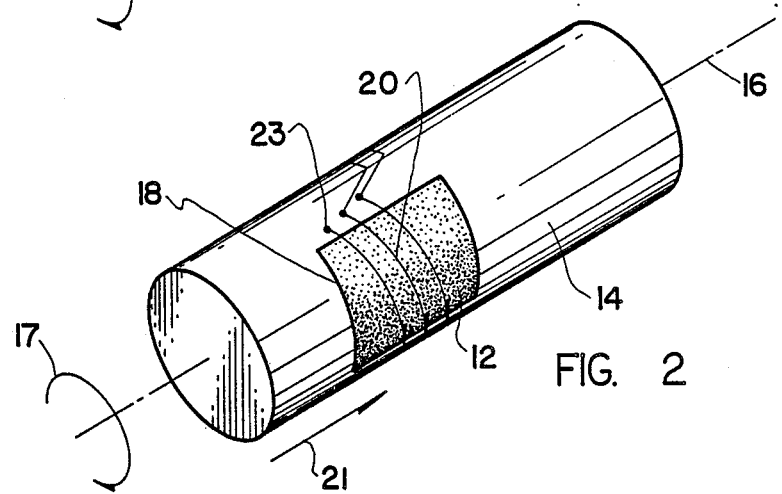
FIG. 2 is a schematic illustration of a scanning line pattern used in accordance with the invention, featuring a circular helix having an oblique angle for rotating the scanned image with respect to the drum revolution axis.
Figure 2A:
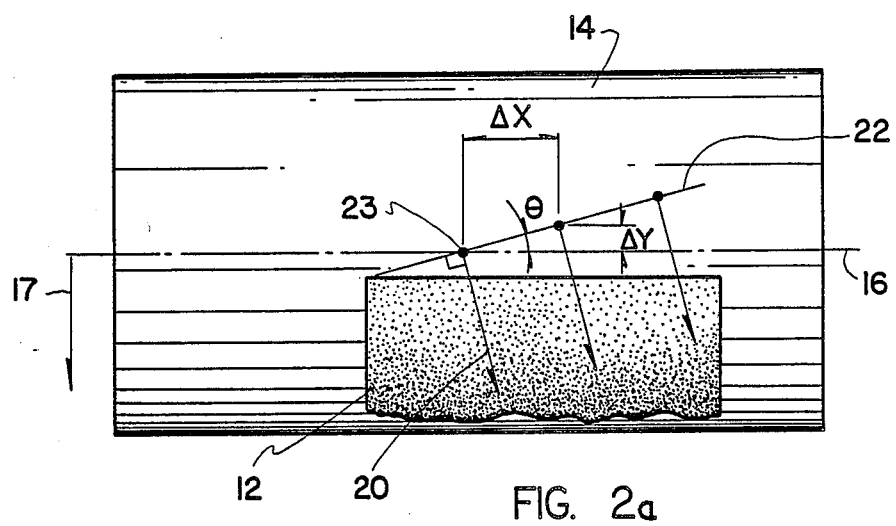
FIG. 2a is an enlarged view of a portion of FIG. 2 showing the oblique angle and its relationship to the drum revolution axis.

Referring now to FIGS. 2-2a there is shown a scanning line pattern 20 as provided in accordance with the principles of the present invention, featuring rotation of the scanned image with respect to the drum 14 by virtue of a sweeping motion of the scanning beam. As described further herein, the original 12 is provided with line illumination along a segment parallel to the drum revolution axis 16. The scanning beam is provided with a sawtooth deflection motion so that it sweeps along the illuminated line segment in the direction of arrow 21, and the resulting scanned image is rotated with respect to the drum 14.

Figure 3:
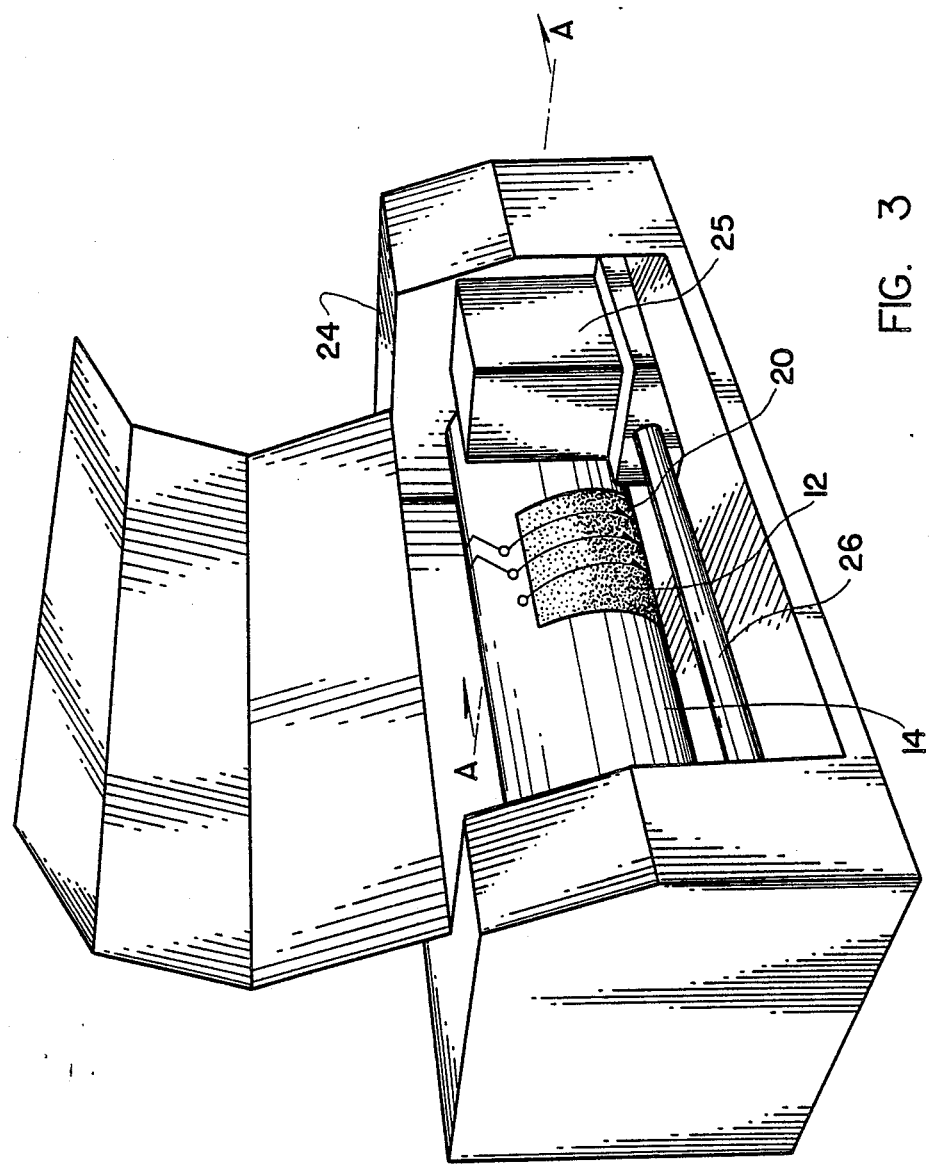
FIG. 3 is an overall perspective view of a typical drum scanner in which the scanning line pattern of FIGS. 2-2a is utilized.

In accordance with the invention, the apparatus for providing the image scan rotation comprises an illumination means for providing the illuminated line segment and a deflection apparatus located in the scanning head (FIG. 3). The deflection apparatus provides the sawtooth deflection motion of the scanning beam and is adjustable for the desired amount of image scan rotation. The adjustment is dependent upon the trace speed with which the scanning beam traverses the length of the illuminated line segment in relation to the drum revolution speed.

For a given relationship between the trace and drum revolution speeds, the amplitude of the deflection motion determines the locus of the scanning line pattern 20 in the shape of a circular helix about the drum and having an oblique angel with respect to the drum revolution axis 16 as shown. As a result, an angle of scan rotation is introduced in the scanned image on the drum 14, eliminating the need to physically reposition the original 12 thereon.

FIG. 2a more clearly depicts the scan rotation angle $\theta$ of the scanned image with respect to the drum revolution axis 16. In order for the scanned image to be rectangular, a crop line 22 can be defined which has a "tilt" and contains the series of starting points 23 at which the scanning line pattern ends a previous trace and begins a new one for the next drum revolution. The crop line 22 itself is perpendicular to each trace of the scanning line pattern 20.

Where the desired scan rotation angle $\theta$ is known, a mathematical definition can be developed for crop line 22 as follows: $\tan\theta = /\Delta y + /\Delta x$, where $/\Delta x$ is the predetermined pitch representing the horizontal increment of the starting point 23. The vertical increment $/\Delta y$ of the starting point 23 from its previous location can thus be determined. As the drum continues to revolve in the direction given by arrow 17, the precise instant before completion of a drum revolution at which the scanning beam begins the next trace of scanning line pattern 20 is determined in accordance with the vertical increment $/\Delta y$.

Turning now to FIG. 3, there is shown an overall perspective view of a typical drum scanner 24 in which the scanning line pattern 20 of FIG. 2 is utilized. In accordance with known techniques, during a scanning operation, drum 14 revolves and a scanning head 25 moves along a linear bearing 26 on which it is mounted, with a drive system (not shown) providing the linear motion via a ball screw 29 (FIG. 4).

While the normal operation of this type of system would produce the scanning line pattern 10 of FIG. 1 on original 12, in accordance with the principles of the present invention, a deflection apparatus disposed inside of scanning head 25 produces the scanning line pattern 20 of FIG. 2 as shown.

Figure 4:
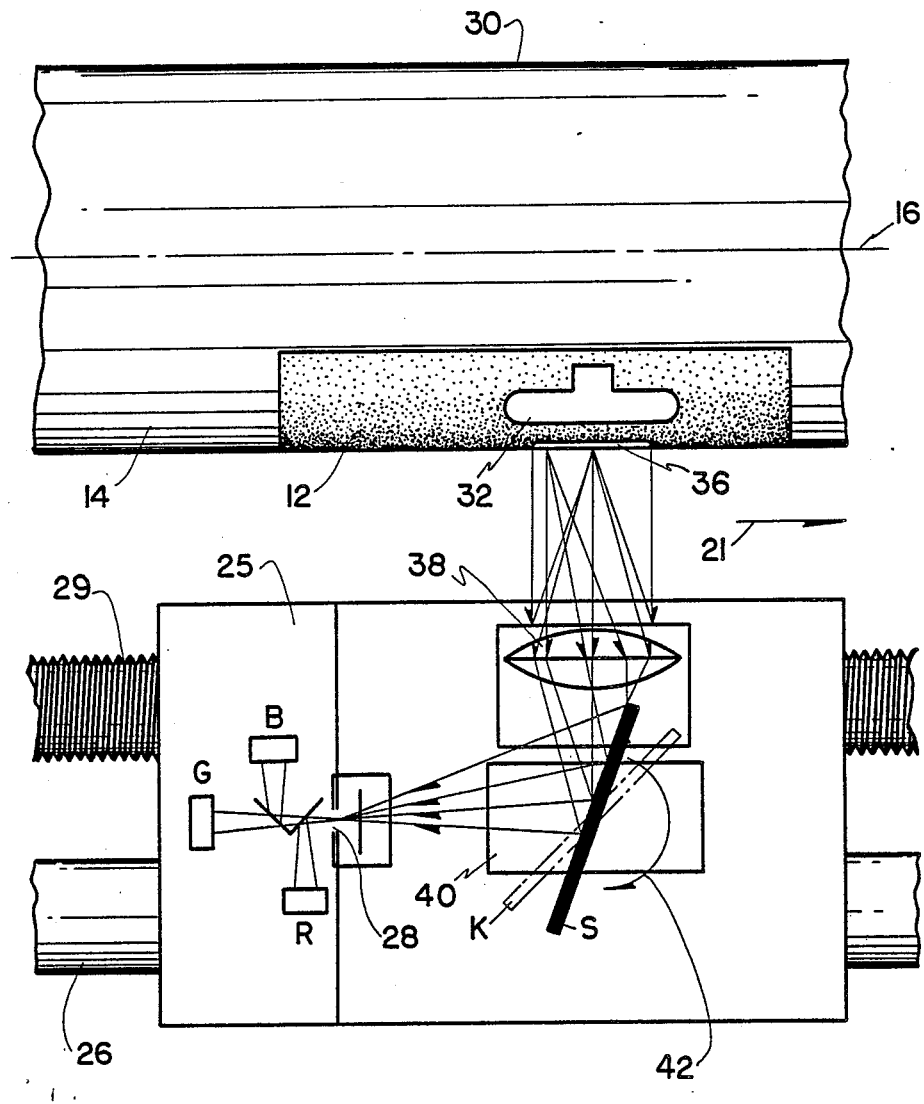

Referring now to FIG. 4, there is shown a sectional view taken along line A—A of FIG. 3, illustrating an optical arrangement 30 for providing the scanning line pattern 20 of FIGS. 2-3 for the original 12 mounted on drum 14. Optical arrangement 30 comprises a light source 32 for directing light onto the original 12. Light source 32 and scanning head 25 are arranged to move parallel to the drum revolution axis 16 in the direction of arrow 21, in synchronization with the speed of revolution of drum 14.

In the preferred embodiment, light source 32 is disposed in drum 14 and comprises a Xenon lamp fed through fiber optics to provide light shaped as a narrow band which is transmitted through the original 12 and forms illuminated line segment 36 parallel to the drum revolution axis 16. In an alternative embodiment, light source 32 is provided external to drum 14 and the light reflected from the original 12 forms illuminated line segment 36.

The remaining components of optical arrangement 30 are contained in scanning head 25. These include a deflection apparatus comprising lens 38 and vibrating mirror 40, which are arranged to scan the points on illuminated line segment 36, coinciding with a portion of the image on original 12. The light reflected by vibrating mirror 40 is directed to a photomultiplier (not shown) through a pin hole 28 and at a system of filters designated R, G, and B. The pin hole 28, light filtering portion and photomultipler of optical arrangement 30 does not form part of the invention and is not described further herein, as this portion is common to known drum scanner designs.

In accordance with the principles of the present invention, optical arrangement 30 provides the scanning line pattern 20 (FIGS. 2-3) of the original 12 mounted on drum 14, and this introduces an angle of scan rotation of the second image. The scanning line pattern 20 is achieved by a sawtooth deflection motion of vibrating mirror 40, such that the scanning beam scans all the points on illuminated line segment 36 in the direction given by arrow 21.

In operation, during one revolution of drum 14, the portion of original 12 coinciding with illuminated line segment 36 continuously changes. Thus, as mirror 40 moves from position "S" to position "K" in the direction of arrow 42, the scanning beam likewise moves to provide the scanning line pattern 20 with a locus of points taking the shape of a circular helix about the drum and having an oblique angle on original 12.

The oblique angle introduces an angle of scan rotation in the scanned image. For a given relationship between the trace speed of the sawtooth deflection movement along illuminated line segment 36 in relation to the drum revolution speed, the amplitude of the deflection determines the scan rotation angle of the scanned image. In this way, the scanning line pattern 20 of FIGS. 2-3 is produced and the scan rotation angle of the scanned image can be varied.

In the preferred embodiment, vibrating mirror 40 comprises a moving iron galvanometer-type optical scanner for controlling mirror deflection, such as that sold by and available from General Scanning Inc., Watertown, Mass. USA. Upon application of an input position command supplied as an analog voltage, this type of optical scanner will accurately and automatically respond. Thus, sawtooth deflection motion of mirror 40 and the scanning line pattern 20 can be readily achieved.

In use, the present invention allows introduction of an angular rotation in a scanned image and thereby allows correction of the misalignment of the original 12 on drum 14. The necessary angular rotation for correction purposes can be easily introduced by adjustment of the mirror 40 deflection amplitude without the need for removing and replacing the original 12 on the drum 14. Thus, the operator set-up procedure is not complicated by additional requirements to physically correct the orientation of the original 12 in cases of misalignment or other desired adjustment.

Figure 5:
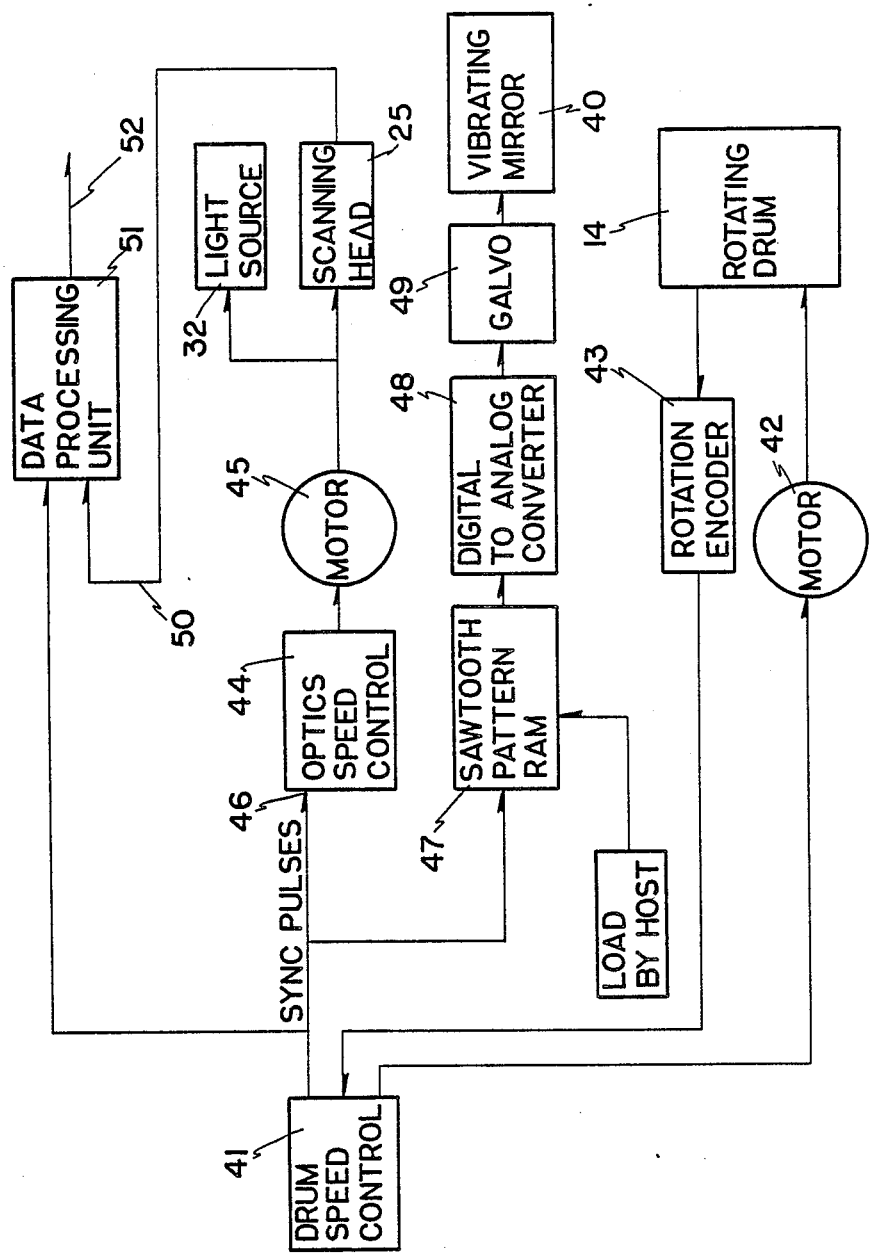
FIG. 5 is a schematic diagram of the control scheme of the deflection apparatus of FIG. 4.

FIG. 5 shows a schematic diagram of a control scheme useful with the present invention. The control blocks represent electronic circuitry which can be implemented in accordance with skill of the art control design techniques as now described.

Drum speed control block 41 provides control of the speed of revolution of drum 14 through motor 42. Using the pulses provided by rotation encoder block 43, the drum speed control block 41 produces high resolution synchronization pulses 46. The pulses 46 map the circumference of the drum, for which the drum speed control block 41 includes a phase lock loop circuit. The optics speed control block 44 uses the synchronization pulses 46 to synchronize the linear motion of both the light source 32 and the scanning head 25 via motor 45.

A memory block 47 provides a RAM for storage of memory locations which are loaded by a host computer with the pattern of a sawtooth represented by digital values. The address of the RAM is reset to zero at the beginning of each drum 14 revolution so that the sawtooth digital data is repeatedly produced at the output of the memory block 47. The digital data output representing the sawtooth pattern is converted to an analog signal in D/A converter 48, which provides its output to galvo control block 49 for control of the deflection produced by vibrating mirror 40.

The sawtooth pattern stored in memory block 47 includes correction for the nonlinearity of the galvo control block 49. The amplitude of the sawtooth pattern is proportional to the desired scan rotation angle. Because the host computer feeds the memory block 47 with the sawtooth pattern, it can directly control the scan rotation angle. This provides the possibility for new interactive applications such as scanning into layout with the correct scan rotation angle determined by the host computer.

The scanning head 25 provides analog data 50 generated by the photomultiplier. The analog data 50 is fed to data processing unit 51 where it is processed to provide digital data 52 corresponding to the image of the original 12. Before digitization, the analog data 50 is sampled in synchronization with the drum revolution to provide the required points per inch resolution on the drum circumference. Synchronization pulses 46 provide the required timing for the sampling.

The crop line 22 of the scanned image is determined by the location of the series of starting points 23 as described with reference to FIG. 2a. The "tilt" of the crop line 22 is formed in data processing unit 51 by determining the precise instant during a drum revolution at which the scanning beam begins the next trace of scanning line pattern 20, in accordance with the vertical increment /y.

Having described the invention in connection with certain specific embodiments thereof, it is to be understood that the description is not meant as a limitation since further modifications may now suggest themselves to those skilled in the art and it is intended to cover such modifications as fall within the scope of the appended claims.

I claim:

1. Apparatus for providing controllable scan rotation of the image representation of an original revolving in a drum scanner, said apparatus comprising:

illustration means defining an illuminated line segment parallel to the drum revolution axis on at least a portion of the revolving original; and a scanning head moving in parallel to the drum revolution axis in accordance with a predetermined pitch, said scanning head comprising:

imaging means for providing the image of said illuminated line segment; and deflection means providing a scanning beam with a controllable sweeping motion along said illuminated line segment image so as to scan successive points of light thereon during revolution of the drum, said controllable sweeping motion being synchronized with the speed of the drum revolution so as to provide on said portion of the revolving original a locus of scanned points having an oblique angle with respect to the drum axis for rotating the image representation.

2. The apparatus of claim 1 wherein said illumination means comprises a light source which moves together with said scanning head in a direction parallel to the drum axis in accordance with said predetermined pitch.

3. The apparatus of claim 1 wherein said illumination means comprises a light source which is fixed in position and provides said illuminated line segment with a length substantially the same as that of said drum.

4. The illumination means of claim 2 wherein said light source is disposed within said drum for providing light for said illuminated line segment by transmission through said portion of the revolving original.

5. The illumination means of claim 3 wherein said light source is disposed within said drum for providing light for said illuminated line segment by transmission through said portion of the revolving original.

6. The illumination means of claim 2 wherein said light source is disposed external to said drum for providing light for said illuminated line segment by reflection from said portion of the revolving original.

7. The illumination means of claim 3 wherein said light source is disposed external to said drum for providing light for said illuminated line segment by reflection from said portion of the revolving original.

8. The optical apparatus of claim 1 wherein said deflection means comprises a vibrating mirror placed in said scanning head between a scanner lens and a photo-multiplier unit receiving the light from said illuminated line segment.

9. The apparatus of claim 1 wherein said deflection means comprises a galvo mirror based on an optical scanner using a moving-iron galvanometer to drive a mirror in an optical scanning excursion range, with said controllable sweeping motion being synchronized with the drum revolution speed to provide one pass along said illuminated line segment per drum revolution.

10. The apparatus of claim 9 wherein a waveform generator controlled by a computer is used for driving said galvo mirror.

11. The apparatus of claim 1 wherein said oblique angle is proportional to the amplitude of said sweeping motion.

12. The apparatus of claim 1 wherein successive repetitions of said scanning beam sweeping motion begin and end at a series of starting points forming a crop line which gives the scanned image a rectangular shape, said series of starting points having horizontal and vertical increments between them, said horizontal increment corresponding to said predetermined pitch, and said vertical increment corresponding to a trigonometric relationship between said pitch and said oblique angle.

13. The apparatus of claim 12 wherein said trigonometric relationship can be expressed by $\tan \theta = /\Delta y \div /\Delta x$ where $\theta$ is said oblique angle, $/\Delta y$ is said vertical increment and $/\Delta x$ is said horizontal increment, said vertical increment determining the precise instant during a drum revolution at which said scanning beam begins the next sweeping motion.

14. A method for providing controllable scan rotation of the image representation of an original revolving in a drum scanner, said method comprising the steps of:

defining an illuminated line segment parallel to the drum revolution axis on at least a portion of the revolving original;

providing the image of said illuminated line segment; and providing a scanning beam with a controllable sweeping motion along said illuminated line segment image so as to scan successive points of light thereon during revolution of the drum, said controllable sweeping motion being synchronized with the speed of the drum revolution so as to provide on said portion of the revolving original a locus of scanned points having an oblique angle with respect to the drum axis for rotating the image representation.

15. For use with the method of claim 13, a host computer for determining rotation of the image representation by computing the parameters of said controllable sweeping motion.

* * * * *